Figure 1:
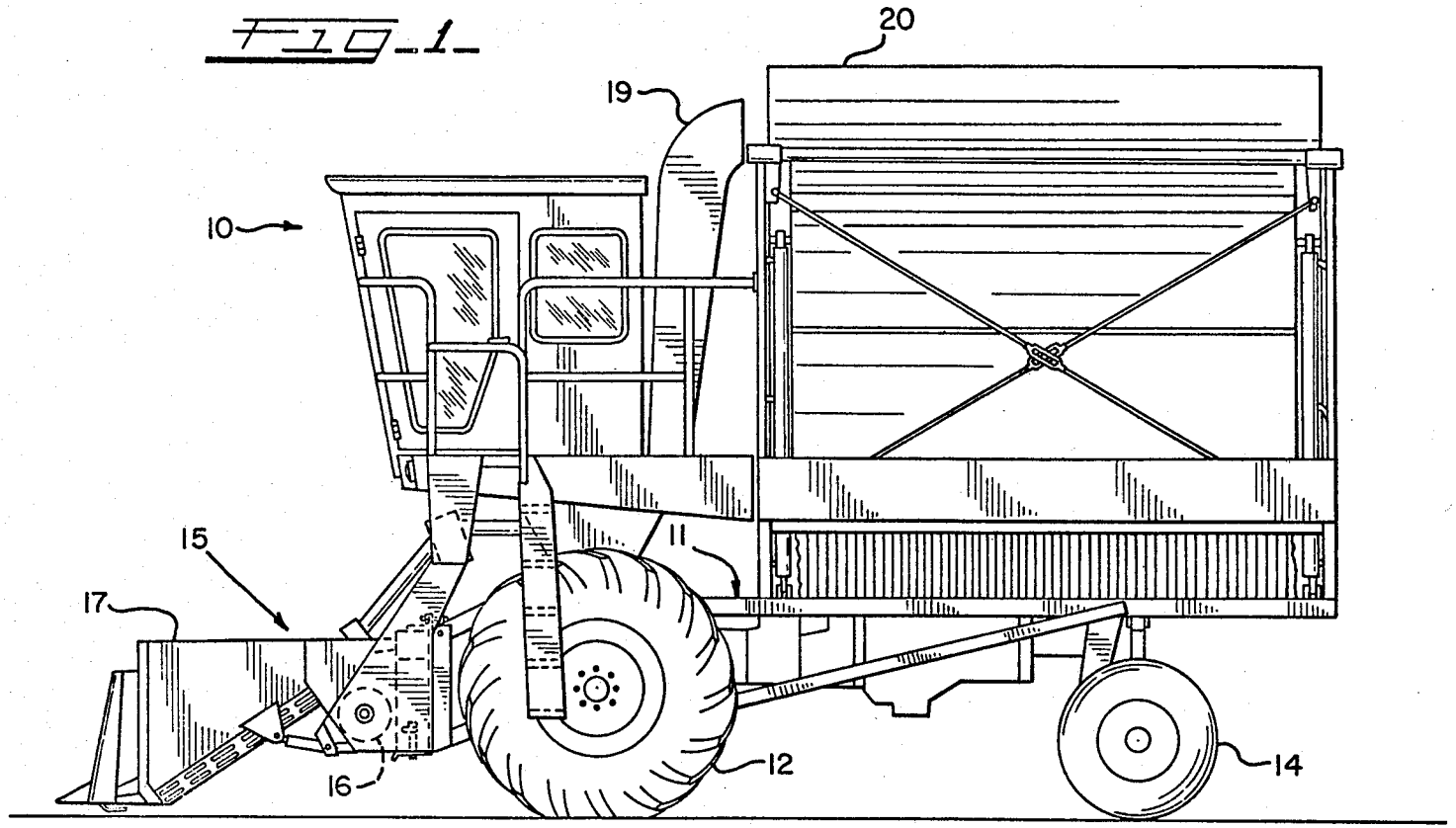
Figures 2, 3, 4:
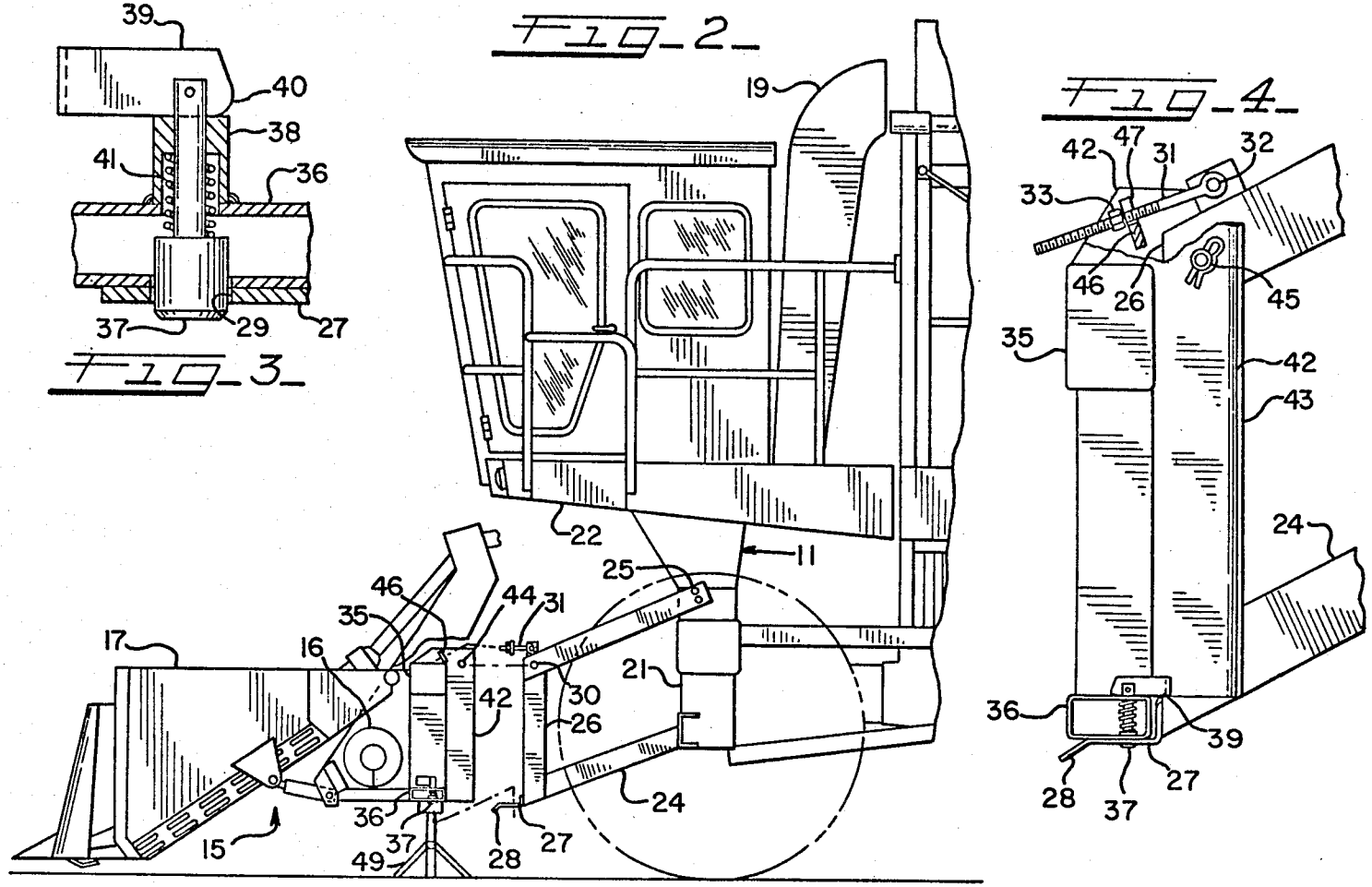

United States Defensive Publication [19] (H) [11] T101,206

Ralston et al. [43] Nov. 3, 1981

[54] COTTON HARVESTER

[76] Inventors: Horace E. Ralston, 7260 Locke Rd., Millington, Tenn. 38053; Jesse H. Orsborn, 5836 Bentley, Clarendon Hills, Ill. 60514

[21] Appl. No.: 208,913

[22] Filed: Nov. 21, 1980

[51] Int. Cl.[3] ..... A01D 35/12; A01D 47/00; A01D 41/00

[52] U.S. Cl. ..... 56/15.6; 56/14.5; 56/208

[57] ABSTRACT

Apparatus for attaching a harvesting header to the vertically fixed subframes of a cotton harvester chassis including apertured horizontal header frame support plates extending forwardly from the lower portion of the subframes, latch pins on the header for engaging the apertures, linear adjustable drawing members releasably interconnecting the upper portion of the header to the upper portion of the subframe, and a pair of spaced vertical plates extending rearwardly from the header and intermeshing with a vertical interface member on the subframe, preferably being pinned thereto for operation of the harvester.

4 Claims, 2 Sheets Drawing,

8 Pages Specification

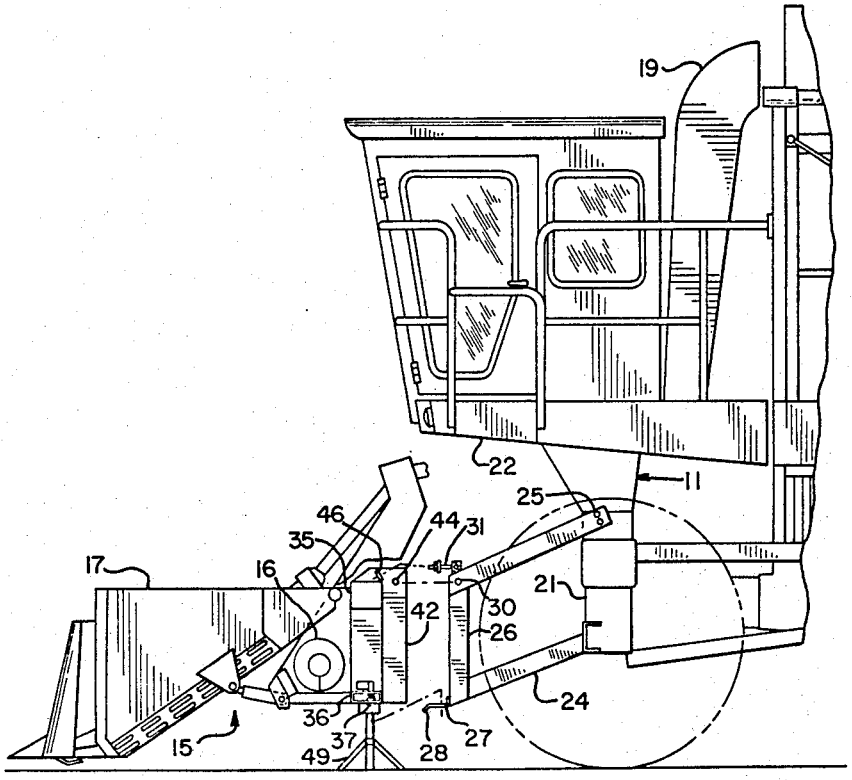

The file of this unexamined application may be inspected and copies thereof may be purchased (849 O.G. 1221, Apr. 9, 1968).